United States Patent [19]
Aritsuka

[11] Patent Number: 5,815,387
[45] Date of Patent: *Sep. 29, 1998

[54] TRANSFORMER PROTECTIVE APPARATUS HAVING SEMICONDUCTOR AND MECHANICAL BYPASS MEANS

[75] Inventor: Tomohiko Aritsuka, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 661,474

[22] Filed: Jun. 11, 1996

[30] Foreign Application Priority Data

Dec. 13, 1995 [JP] Japan .................................. 7-324858

[51] Int. Cl.⁶ .......................... H02H 7/125; H02H 7/045
[52] U.S. Cl. .......................... 363/54; 361/36; 361/100; 361/102
[58] Field of Search ................ 361/35, 57, 100, 361/54, 38, 36, 55, 102, 101; 363/53, 54

[56] References Cited

U.S. PATENT DOCUMENTS

| | | | |
|---|---|---|---|
| 3,590,319 | 6/1971 | Baltensperger | 361/10 |
| 4,438,474 | 3/1984 | Paice | 361/58 |
| 4,922,364 | 5/1990 | Paulsson | 361/56 |
| 5,206,775 | 4/1993 | Wilson | 361/38 |
| 5,309,346 | 5/1994 | Gyugyi . | |
| 5,392,184 | 2/1995 | Unterlass et al. | 361/16 |
| 5,537,283 | 7/1996 | Keese | 361/40 |

Primary Examiner—Peter S. Wong
Assistant Examiner—Derek J. Jardieu
Attorney, Agent, or Firm—Leydig, Voit & Mayer

[57] ABSTRACT

A power converter protective apparatus for protecting an AC-DC converter against an excess fault current by preventing the fault current of a power system from flowing into the AC-DC converter. The protective apparatus comprises a series transformer, whose primary winding is connected in series with a power system and whose secondary winding is connected to a voltage-type AC-DC converter, first current bypass means of a normally open-type connected in parallel with the primary winding, a current transformer for detecting a fault current in the power system, and a control unit for outputting a bypass control signal to the first current bypass means when the current transformer detects the fault current, whereby when the fault in the power system is detected, a fault current flowing through the primary winding is bypassed by the first current bypass means.

6 Claims, 15 Drawing Sheets

TRANSFORMER PROTECTIVE APPARATUS HAVING SEMICONDUCTOR AND MECHANICAL BYPASS MEANS

BACKGROUND OF THE INVENTION

1. Field of the Invention

The present invention relates to a power converter protective apparatus for protecting a voltage-type AC-DC converter connected in series with a power system from fault current that flows in the event of a system fault.

2. Description of the Related Art

FIG. 15 shows the AC-DC converter protective apparatus disclosed in U.S. Pat. No. 5,309,346 issued May 3, 1994, entitled "TRANSMISSION LINE FAULT CURRENT DYNAMIC INVERTER CONTROL," wherein a voltage-type AC-DC converter connected in series with a power transmission line is protected from a transmission line fault current. FIG. 15 shows c-phase, one of the three phases of an electric power system and a portion that is common to three phases (without the subscript c).

In a series system interconnection assembly 46 that is made up of a voltage-type AC-DC converter protective apparatus and a power system, the primary winding 71c side of a series transformer 49c is connected in series with the c phase of a power system (bus) 48c, and a voltage-type AC-DC converter 50 is connected to the secondary winding 72c side. Also connected to the power system 48c are a current transformer (CT) 64 for picking up a system current Ic and a potential transformer (PT) 62c for picking up a power system voltage. A line inductance XL 59c that contributes to a voltage drop VL lies in the power system 48c.

The voltage-type AC-DC converter 50 comprises flywheel diodes 54c1, 54c2, 58c1, and 58c2 which are respectively anti-parallel connected with self-arc-extinguishing type semiconductor devices (hereinafter referred to as "self-arc-extinguishing type devices"), such as GTOs, 52c1, 52c2, 56c1, and 56c2 in a bridge configuration. A DC capacitor 55 (common to all a, b, and c phases) is connected to the DC output side of the voltage-type AC-DC converter 50, and a voltage transformer 31 for picking up a DC current is connected across the DC capacitor 55.

The pickup outputs of the current transformer (CT) 64c, the potential transformer (PT) 62c and the voltage transformer 31 are fed to a control unit 60 for providing gate signals for ON/OFF operations of the self-arc-extinguishing type devices 52c1, 52c2, 56c1 and 56c2. In response to these pickup outputs, the control unit 60 provides a gate signal 61c to the self-arc-extinguishing type devices 52c1 and 52c2, and a gate signal 63c to the self-arc-extinguishing type devices 56c1 and 56c2.

The operation of the prior art apparatus is discussed below. Unless otherwise required, the discussion on one phase (c phase) only.

For the purpose of compensating for the voltage drop VL attributed to the line inductance XL 59c in the c phase of the power system 48, the series system interconnection assembly 46 is constructed by connecting the primary winding 71c of the series transformer 49c in series with the power system 48c so that a voltage V2 generated by the voltage-type AC-DC converter 50 is applied to the secondary winding 72c.

The control unit 60 picks up system currents I (which collectively represents system currents Ia, Ib, and Ic for three phases) by the current transformer 64 (inclusive of 64c for the c phase as well), picks up power system voltages by the voltage transformer 62 (inclusive of 62c for the c phase as well), and computes an output current for compensating for the line voltage and phase.

In accordance with the result of the computation, the control unit 60 outputs the switching signal 61c to the self-arc-extinguishing type devices 52c1 and 52c2 and the switching signal 63c to the self-arc-extinguishing type devices 56c1 and 56c2, thereby controlling the voltage-type AC-DC converter 50 and compensating for the line voltage and phase in the c phase.

The DC voltage output of the voltage transformer 31 is input to the control unit 60. The control unit 60 detects a fault that takes place in the power system 48c by monitoring a rise or fall of the DC voltage Vd applied across the DC capacitor 55 above or below a predetermined value. When a fault occurrence is detected, the control unit 60 arc-controls the self-arc-extinguishing type devices 52c1, 52c2, 56c1 and 56c2 to protect them.

In the prior art voltage-type AC-DC converter protective apparatus thus constructed, when an excess system current (hereinafter referred to as "fault current") generated in the power system due to a system fault in the power system flows through the primary winding of the series transformer, a fault current proportional to the winding ratio is induced in the secondary winding. This fault current flows through the semiconductor devices of the voltage-type AC-DC converter (such as the self-arc-extinguishing type devices and flywheel diodes).

In this case, KTR represents the winding ratio of the primary winding to the secondary winding in the series transformer, Io the maximum value of the current (power flow) normally flowing through the power system, and Im the maximum value of the fault current, and a current of KTR×Im×√2 flows. Thus, the current rating of semiconductor devices should be designed to be KTR×Im×√2. Although the rating of the semiconductor device is KTR×Im×√2, a current of KTR×Io×√2 flows through the semiconductor devices in normal operation, and this is translated to the use of the semiconductor devices at a fraction of their capacity equal to a ratio KTR×Io×√2/KTR×Im×√2=Io/Im (<1).

To prevent the voltage-type AC-DC converter from being damaged by a fault current flow, the voltage-type AC-DC converter requires a power capacity rating Im/Io (1>) times the power capacity rating for normal operation. Since the capacity of the voltage-type AC-DC converter is generally proportional to the number of devices in use, the number of the devices required is increased by Im/Io times. Associated components and physical members are also increased in the same proportion, increasing the cost, installation space, and bulk of the voltage-type AC-DC converter and subsequently lowering its reliability.

When a fault current flows due to a fault in the power system, a fault current proportional to the winding ratio flows through the secondary winding of the series transformer. This fault current flows through the semiconductor devices in the voltage-type AC-DC converter, heating them and, at the worst case, fusing them.

A circuit breaker may be provided at the secondary winding side of the series transformer to disconnect the voltage-type AC-DC converter. When such a circuit breaker is activated to disconnect the series transformer from the voltage-type AC-DC converter, the secondary winding of the series transformer is set to be in an open-circuit. If this happens, the impedance of the primary winding of the series transformer becomes infinite. This partitions the power system at both ends of the primary winding of the series transformer, and the power system and the converter system continue to be disadvantageously isolated until the voltage-type AC-DC converter is recovered from the fault.

SUMMARY OF THE INVENTION

The present invention has been developed to resolve the above described problem, and it is an object of the present invention to provide a power converter protective apparatus, in which a voltage-type AC-DC converter having the power capacity rating for normal operation without giving consideration to an excess fault current flowing in the event of a system fault is incorporated in a power system and the voltage-type AC-DC converter is immediately protected against an excess current by preventing the fault current in the power system from flowing into the voltage-type AC-DC converter.

The power converter protective apparatus according to the present invention comprises a transformer, having a primary winding connected in series with a power system and a secondary winding connected to a power converter, first current bypass means of a normally open-type connected in parallel with the primary winding, fault detector means for detecting a fault in the power system, and control means for outputting a bypass control signal to the first current bypass means when the fault detector means detects the fault, whereby when the fault in the power system is detected, a fault current flowing through the primary winding is bypassed by the first current bypass means.

The first current bypass means comprises the parallel connection of a high-voltage bypass semiconductor circuit breaker and a high-voltage bypass mechanical circuit breaker, and activates its high-voltage bypass semiconductor circuit breaker for a fixed duration of time at the moment the fault is detected, while keeping its high-voltage bypass mechanical circuit breaker activated until the fault is removed.

The first current bypass means, comprising a high-voltage bypass mechanical circuit breaker, is activated at the moment the fault is detected and is continuously activated until the fault is removed.

The first current bypass means, comprising a high-voltage bypass semiconductor circuit breaker, is activated at the moment the fault is detected and is continuously activated until the fault is removed.

The power converter protective apparatus according to the present invention comprises a transformer, having a primary winding connected in series with a power system and a secondary winding connected to a power converter, second current bypass means of a normally open-type connected in parallel with the secondary winding, fault detector means for detecting a fault in the power system, and control means for outputting a bypass control signal to the second current bypass means when the fault detector means detects the fault, whereby when the fault in the power system is detected, a fault current flowing through the secondary winding is bypassed by the second current bypass means.

The power converter protective apparatus according to the present invention comprises a transformer, having a primary winding connected in series with a power system and a secondary winding connected to a power converter, two mechanical circuit breakers connected in series with the primary winding and the power system with the primary winding between the two mechanical circuit breakers, a high-voltage bypass mechanical circuit breaker connected in parallel with the series connection of the two mechanical circuit breakers and the primary winding, second current bypass means of a normally open-type connected in parallel with the secondary winding, fault detector means for detecting a fault in the power system, and control means for outputting a bypass control signal to the second current bypass means when the fault detector means detects the fault, whereby when the fault in the power system is detected, a fault current flowing through the secondary winding is bypassed by the second current bypass means.

The second current bypass means comprises the parallel connection of a low-voltage bypass semiconductor circuit breaker and a low-voltage bypass mechanical circuit breaker, and activates its low-voltage bypass semiconductor circuit breaker for a fixed duration of time at the moment the fault is detected, while keeping its low-voltage bypass mechanical circuit breaker activated until the fault is removed.

The second current bypass means, comprising a low-voltage bypass mechanical circuit breaker, is activated at the moment the fault is detected and is continuously activated until the fault is removed.

The second current bypass means, comprising a low-voltage bypass semiconductor circuit breaker, is activated at the moment the fault is detected and is continuously activated until the fault is removed.

The power converter protective apparatus according to the present invention comprises a transformer, having a primary winding connected in series with a power system and a secondary winding connected to a power converter, two mechanical circuit breakers connected in series with the primary winding and the power system with the primary winding between the two mechanical circuit breakers, a high-voltage bypass mechanical circuit breaker connected in parallel with the series connection of the two mechanical circuit breakers and the primary winding, a high-voltage bypass semiconductor circuit breaker connected in parallel with the primary winding, fault detector means for detecting a fault in the power system, and control means which activates the high-voltage bypass semiconductor circuit breaker for a fixed duration of time at the moment the fault is detected by fault detector means while keeping the high-voltage bypass mechanical circuit breaker continuously activated until the fault is removed, whereby when the fault in the power system is detected, a fault current flowing through the primary winding is bypassed by the high-voltage bypass mechanical circuit breaker.

The fault detector means detects the fault in the power system from the secondary winding side of the transformer.

DETAILED DESCRIPTION OF THE PREFERRED EMBODIMENTS

Embodiment 1

Figure 1:
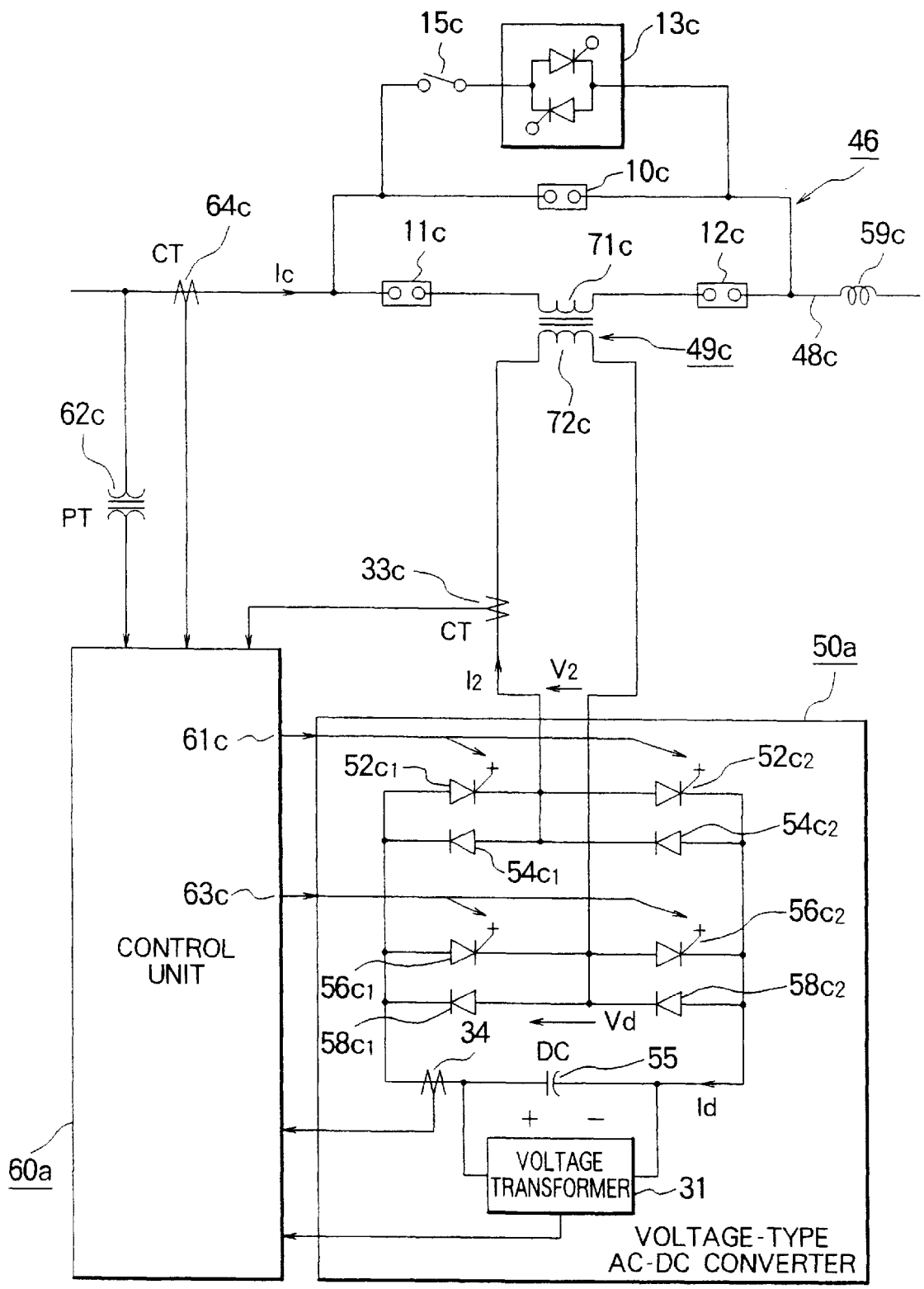
FIG. 1 is a schematic diagram of the power converter protective apparatus according to a first embodiment of the present invention.
Figure 2:
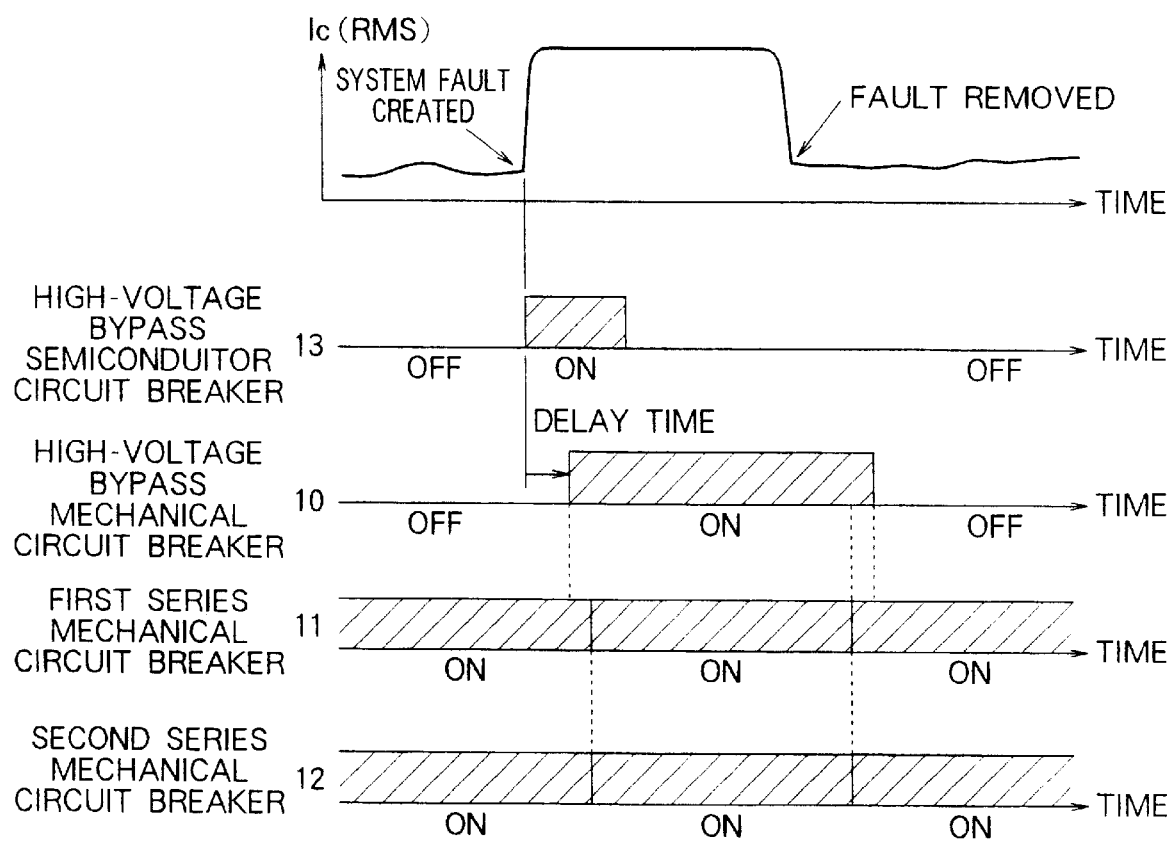
FIG. 2 is a timing diagram showing the operation of the first embodiment of the present invention.
Figure 15:
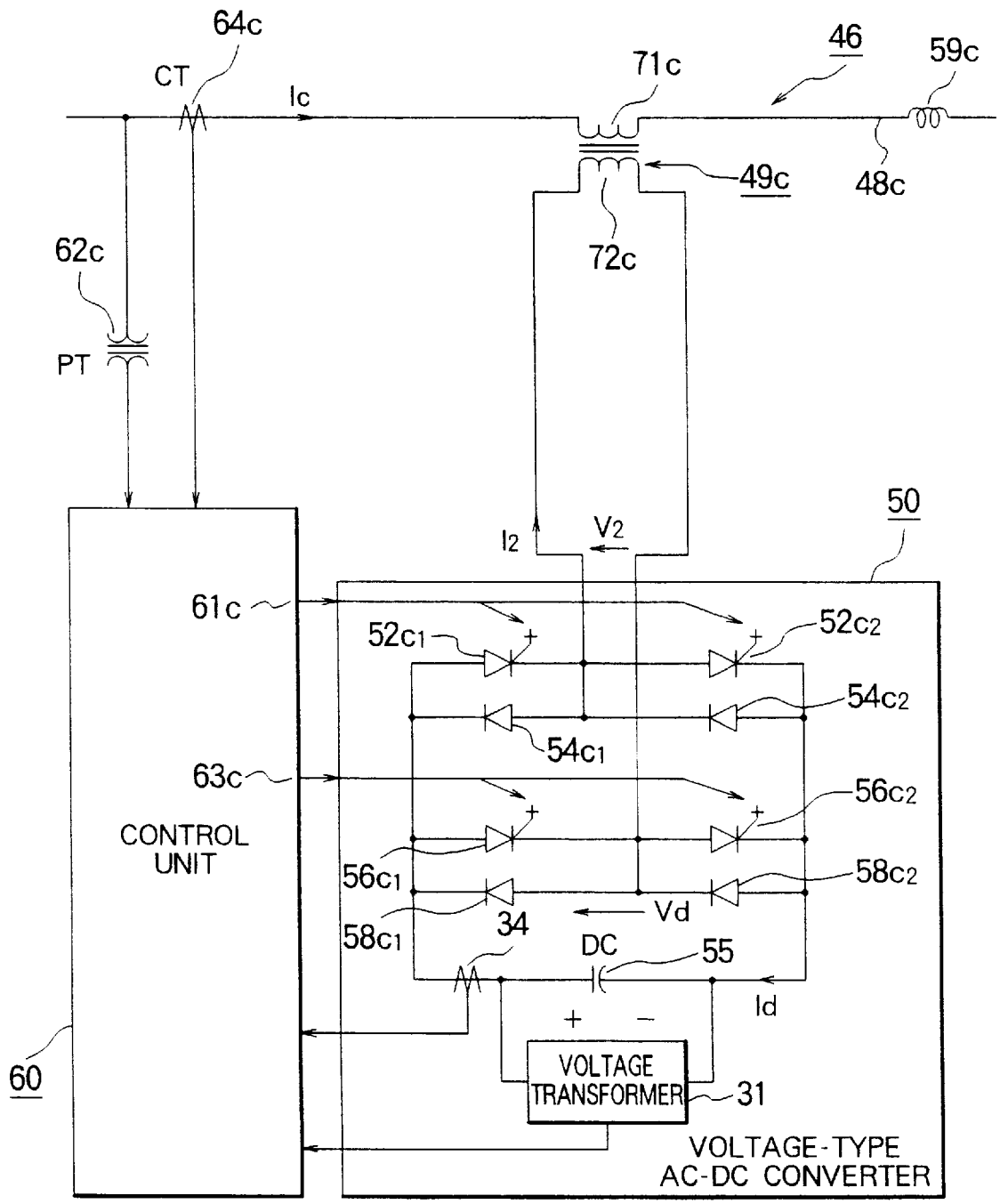
FIG. 15 is a schematic diagram showing the prior art series system interconnection assembly.

Referring to FIGS. 1 and 2, the first exemplary embodiment of the present invention is discussed. FIG. 1 is the schematic diagram of the power converter protective apparatus according the first exemplary embodiment. In FIG. 1, the components equivalent to those with reference to FIG. 15 are designated with the same reference numerals. The terminal ends of the primary winding 71c of a series transformer 49c are connected via respective series mechanical circuit breakers 11c, 12c to power buses that comprises a power system 48c. A high-voltage bypass mechanical circuit breaker 10c is connected in parallel with the series connection of the primary winding 71c and the series mechanical circuit breakers 11c, 12c. Further connected in parallel with the high-voltage bypass mechanical circuit breaker 10c is a series connection of a mechanical disconnecting switch 15c and a high-voltage bypass semiconductor circuit breaker 13c made up of a pair of semiconductor switching devices (thyristors, GTOs or the like) that are anti-parallel connected.

The secondary winding side of the series transformer 49c is provided with a current transformer 33c, and the current detected by the current transformer 33c is fed to a control unit 60a. The DC side of a voltage-type AC-DC converter 50a is provided with a current transformer 34, and the current detected by the current transformer 34 is fed to the control unit 60a.

The operation of the first exemplary embodiment is now discussed referring to the timing diagram in FIG. 2. In FIG. 2, when a system current Ic flowing through the power system 48c is smaller than a rated current, the high-voltage bypass mechanical circuit breaker 10c is deactivated or at its open state, the series mechanical circuit breakers 11c, 12c are activated or at an ON state, and the high-voltage bypass semiconductor circuit breaker 13c is deactivated or at an OFF state.

The voltage-type AC-DC converter 50a is thus interconnected to the power system 48c via the secondary winding 72c and primary winding 71c of the series transformer 49c. Self-arc-extinguishing type devices 52c1, 52c2, 56c1, 56c2 that comprises a circuit unit (not shown) of the voltage-type AC-DC converter 50a perform an ON/OFF switching operation in response to gate signals 61c, 63c provided by the control unit 60a.

When the system current Ic flowing through the power system 48c is an excess current (fault current) that is in excess of the rated current, the current transformer 64c picks up the system current Ic and outputs the detected current to the control unit 60a. Upon reception of the detected current at a fault, the control unit 60a outputs a gate signal to the high-voltage bypass semiconductor circuit breaker 13c immediately (within 1 ms) to activate it, and, then with a constant operational delay, outputs an ON signal to the high-voltage bypass mechanical circuit breaker 10c to activate it within a few tens of ms.

As a result, the fault current is bypassed by the high-voltage bypass semiconductor circuit breaker 13c and then after a constant period is bypassed by the high-voltage bypass mechanical circuit breaker 10c, and thereby the fault current is prevented from flowing through the primary winding 71c of the series transformer 49c. The control unit 60a outputs the switching signals 61 to the self-arc-extinguishing type devices 52 and 56 for each phase in order to deactivate the self-arc-extinguishing type devices 52 and 56 that comprise the circuit unit of the voltage-type AC-DC converter 50a connected in series with the power system for each phase.

Alternatively, the control unit 60a controls the output AC voltage to zero to continue operation instead of deactivating the self-arc-extinguishing devices 52 and 56. By bypassing the fault current flowing through the power system 48c with the series transformer 49c, and by output-controlling the self-arc-extinguishing type devices 52 and 56, excess currents are prevented from flowing through the semiconductor devices in the voltage-type AC-DC converter 50a to protect them, while at the same time the series system interconnection assembly 46 including the primary winding 71c of the series transformer 49c is protected against the system fault.

In the voltage-type AC-DC converter 50a constructed, one can design its capacity taking into consideration in this manner only the maximum currents expected to flow in normal operating conditions through the self-arc-extinguishing type devices 52c1, 52c2, 56c1, and 56c2 and flywheel diodes 54c1, 54c2, 58c1, and 58c2, without giving consideration to the fault current. Therefore, the count of the semiconductor devices is minimized and the cost for the apparatus is reduced, and the installation space and bulk of the apparatus are reduced, and an increased reliability is achieved.

Besides picking up the fault current in the power system 48c via the current transformer 64c, the control unit 60a monitors the system voltage through the voltage transformer 62 (collectively represents the voltage transformers for the three phases including 62c). The control unit 60a may protect the power system by detecting a fault in the power system, for example, by detecting a voltage drop, overvoltages, unbalanced threephase voltages, abnormal frequency, and variations in harmonic contents and by detecting a fault in the power system.

The control unit 60a detects a fault in the power system or a fault in the voltage-type AC-DC converter 50a by monitoring an excess current detected by the current transformer 33c for picking up an AC current I2 of the voltage-type AC-DC converter 50a, an excess current detected by the current transformer 34 for picking up an DC current Id of the voltage-type AC-DC converter 50a, a DC excess voltage or a DC low voltage detected by the voltage transformer 31 for picking up a DC voltage Vd of the voltage-type AC-DC converter 50a. In response to these detected results, the control unit 60a can immediately protect the power system 48c or the voltage-type AC-DC converter 50a.

The reason both the high-voltage bypass semiconductor circuit breaker 13c and the high-voltage bypass mechanical circuit breaker 10c are used together is as follows. The high-voltage bypass semiconductor circuit breaker 13c is a fast-switching device that can be quickly set to ON and if the duration of current conduction for a fault current is set short, the rated power and rated thermal capacity requirements of the semiconductor components are lowered. If the fault current is conducted for a relatively long period of time, semiconductor devices such as thyristors or GTOs may be heated because of their own small resistance, thereby causing damage.

Thermal considerations thus require heavy-duty semiconductor devices and cooling equipment, increasing the cost of the apparatus and making the apparatus itself bulky. For this reason, the bypassing action of the fault current that is the cause of heat is thus taken over by the high-voltage bypass mechanical circuit breaker 10c that is thermally heavy-duty, in succession to the high-voltage bypass semiconductor circuit breaker 13c. This arrangement eliminates the need for a bulky and expensive apparatus comprising heavy-duty semiconductor devices and cooling equipment.

While the high-voltage bypass mechanical circuit breaker 10c is activated, the series mechanical circuit breakers 11c, 12c connected in series with the primary winding 71c of the series transformer 49c at both its ends are left closed. Once they are opened, some time is required before the series mechanical circuit breakers 11c, 12c come back to their closed state, and thus an immediate interconnection of the series system interconnection assembly 46 back into the system is difficult at the moment the system is recovered from the system fault. The series mechanical circuit breakers 11c and 12c are provided to disconnect the series system interconnection assembly 46 from the power system 48c when the series system interconnection assembly 46 itself is suspended or fails.

Even when the voltage-type AC-DC converter 50a is disconnected from the secondary winding 72c for maintenance, the impedance at the primary winding 71c side of the series transformer 49c is prevented from reaching to infinity as long as the series mechanical circuit breakers 11c and 12c and the high-voltage bypass mechanical circuit breaker 10c are left at an ON state. This arrangement precludes such an inconvenience that the power system is disconnected at both terminal ends of the primary winding 71c of the series transformer 49c and that both the power system 48c and the converter system remain disconnected from each other until the voltage-type AC-DC converter 50 is recovered.

After verifying that the power system 48c has recovered from the system fault, the control unit 60a opens the high-voltage bypass mechanical circuit breaker 10c to cause the voltage-type AC-DC converter 50a to operate normally. When the power system 48c has recovered prior to the activation of the high-voltage bypass mechanical circuit breaker 10c, the control unit 60a, without activating the high-voltage bypass mechanical circuit breaker 10c, deactivates the high-voltage bypass semiconductor circuit breaker 13c for normal operating conditions (system restart), thereby restarting the operation of the series system interconnection assembly 46.

Since this restart method allows the series transformer 49c to be interconnected back into the system without partially magnetizing the series transformer 49c and thus without disturbing the power system, the restart method is applied not only for a system fault recovery but also for a normal operation routine when the series system interconnection assembly 46 is initiated.

While the high-voltage bypass semiconductor circuit breaker 13c is at its OFF state, both terminals are not electrically insulated to each other. To electrically isolate the system at both terminals of the high-voltage bypass mechanical circuit breaker 10c, while it is opened, the mechanical disconnecting switch 15c connected in series with the high-voltage bypass semiconductor circuit breaker 13c is set to OFF.

Embodiment 2

Figure 4:
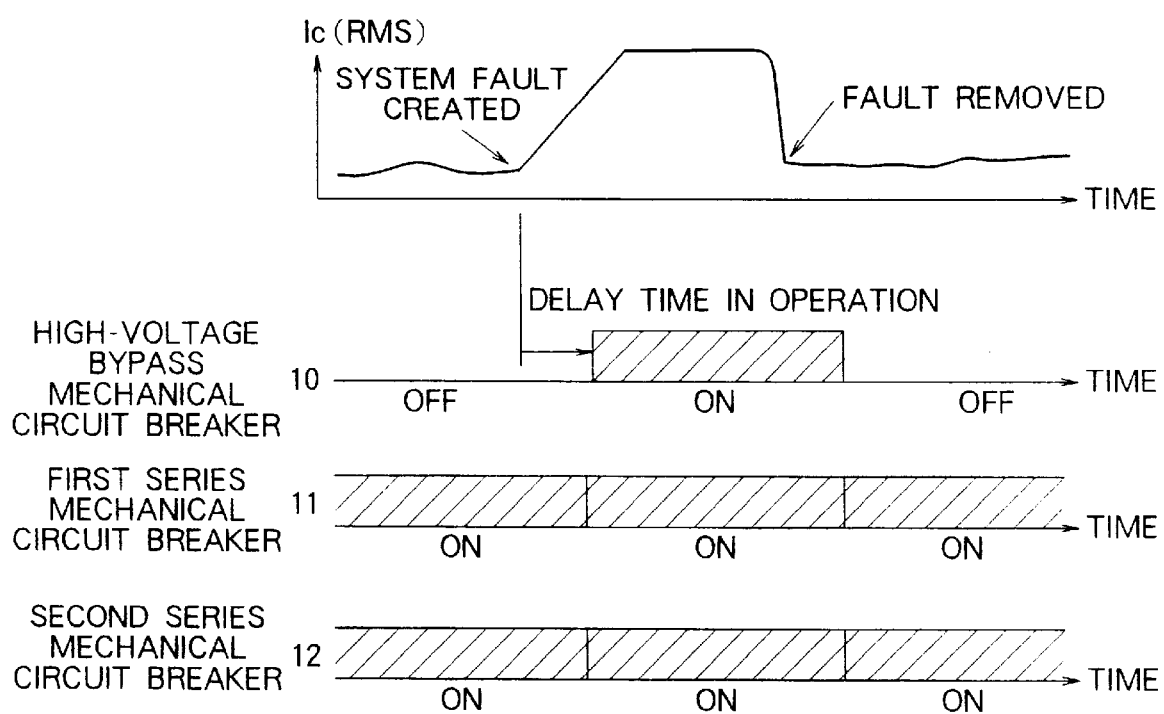
FIG. 4 is a timing diagram showing the operation of the second embodiment of the present invention.

In the first exemplary embodiment, the control unit 60a first activates the high-voltage bypass semiconductor circuit breaker 13c immediately after a system fault is detected. When the system inductance XL 59c lying in the c phase of the power system 48c is high, or when the switching speed to ON in the high-voltage bypass mechanical circuit breaker 10c is set to be fast, however, the high-voltage bypass mechanical circuit breaker 10c is fast enough in shifting to the ON state to bypass the fault current without the need for using the high-voltage bypass semiconductor circuit breaker 13c, because the system current Ic at the system fault in the power system 48c rises at a relatively slow speed as shown in FIG. 4.

Figure 3:
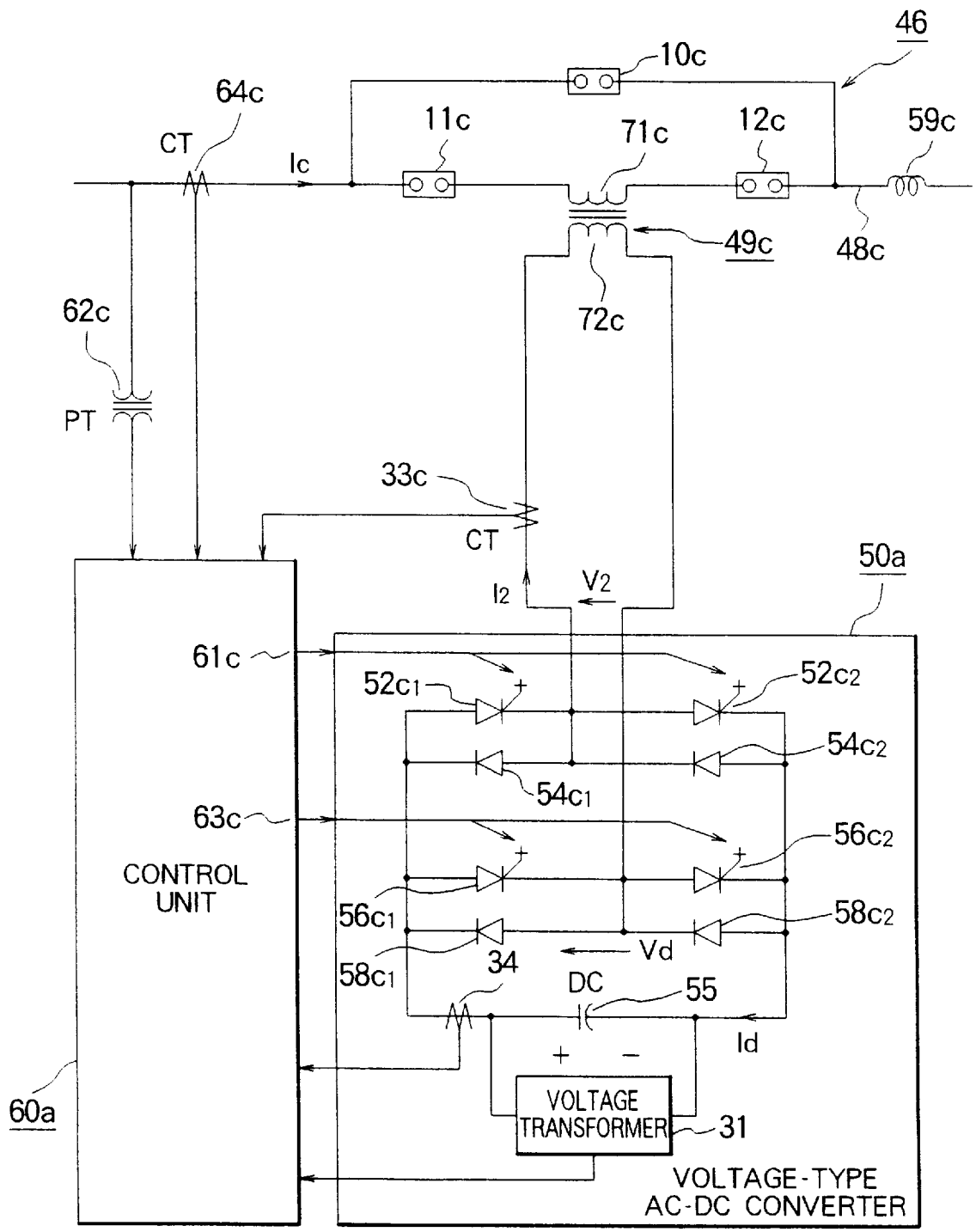
FIG. 3 is a schematic diagram of the power converter protective apparatus according to a second embodiment of the present invention.

FIG. 3 shows schematic diagram of the power converter protective apparatus according to the second exemplary embodiment of the present invention. In FIG. 3, the components equivalent to those with reference to FIG. 1 are designated with the same reference numerals. The difference in the circuit from the apparatus of the first exemplary embodiment is that the high-voltage bypass semiconductor circuit breaker 13c and the mechanical circuit breaker 15c, connected in parallel with the high-voltage bypass mechanical circuit breaker 10c, are no longer required.

The high-voltage bypass mechanical circuit breaker 10c is relatively higher at voltage level than a low-voltage bypass mechanical circuit breaker 21c, as will be described later, provided at the secondary winding side of the series transformer 49c, and currents flowing through the contacts of the high-voltage bypass mechanical circuit breaker 10c are relatively smaller thus, the contacts of a smaller contact space and smaller cross-section work. The contacts are thus light weight, permitting fast open-close operation. Furthermore, elimination of the high-voltage bypass semiconductor circuit breaker 13c and the mechanical circuit breaker 15c reduces the cost and required installation space of the apparatus.

Embodiment 3

Figure 5:
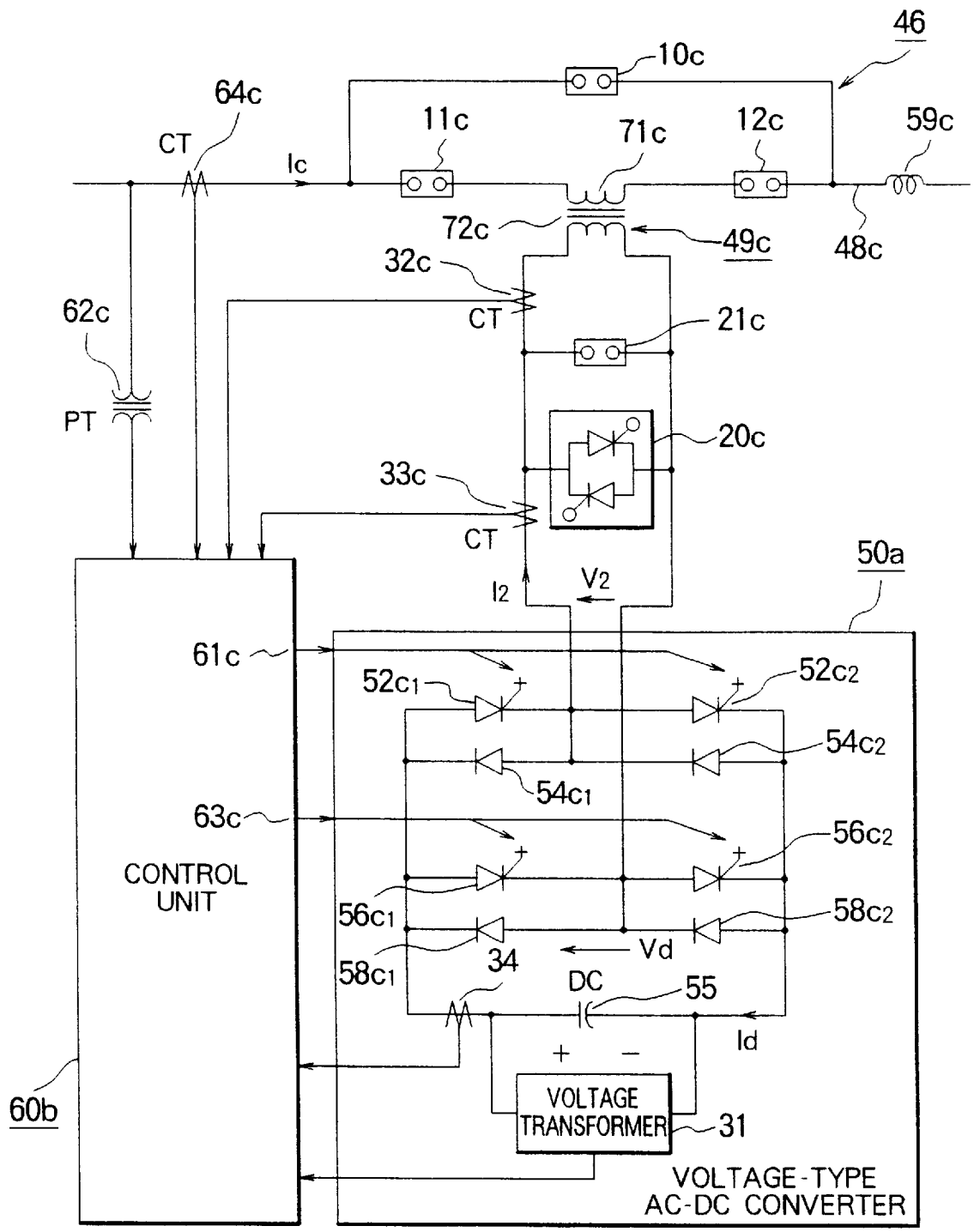
FIG. 5 is a schematic diagram of the power converter protective apparatus according to third embodiment of the present invention.

In the first and second exemplary embodiments, the system current Ic that flows through the primary winding of the series transformer 49c at a fault is bypassed by the high-voltage bypass semiconductor circuit breaker 13c and the high-voltage bypass mechanical circuit breaker 10c. In the third exemplary embodiment, as shown in FIG. 5, the high-voltage bypass mechanical circuit breaker 10c is connected in parallel with the primary winding 71c of the series transformer 49c as in the secondary exemplary embodiment, and further both the low-voltage bypass mechanical circuit breaker 21c and the low-voltage bypass semiconductor circuit breaker 20c constructed of semiconductor devices such as thyristors and GTOs are connected in parallel with the secondary winding 72c of the series transformer 49c.

Further provided are a current transformer 32c for picking up the AC current flowing through the secondary winding 72c of the series transformer and a current transformer 33c for picking up the AC current I2 output by the voltage-type AC-DC converter 50.

Figure 6:
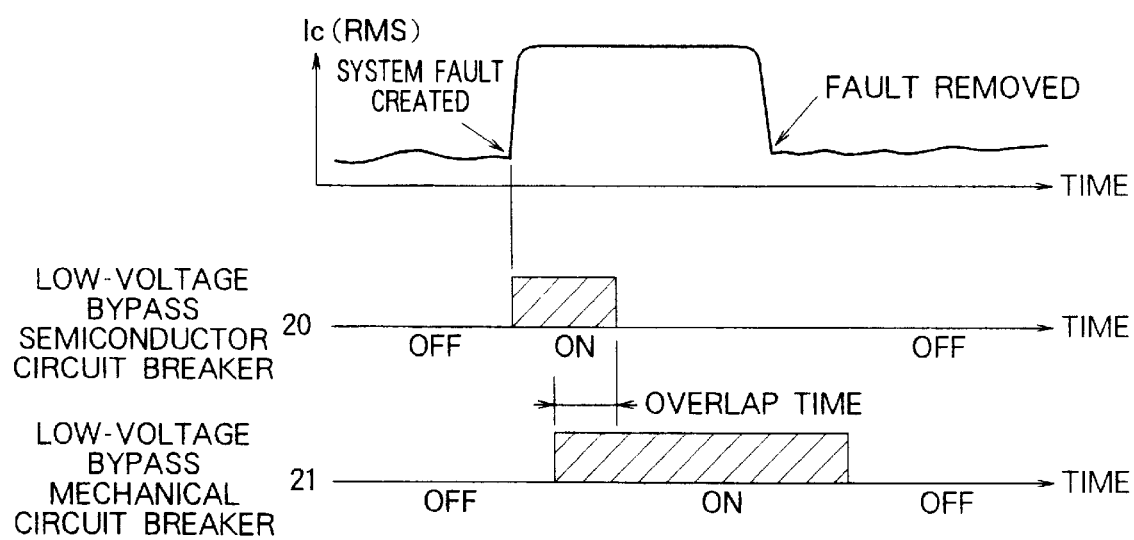
FIG. 6 is a timing diagram showing the operation of the third embodiment of the present invention.

Referring now to the timing diagram in FIG. 6, the operation of the third exemplary embodiment is discussed.

Unless otherwise required, the discussion that follows is for one phase (c phase) only.

When an excess fault current flows through the primary winding 71c of the series transformer 49c in the event of a fault in the power system 48c, a fault current proportional to the winding ratio of the series transformer 49c flows through the secondary winding 72c of the series transformer.

Besides the fault detection method of a system fault described in the first exemplary embodiment, the control unit 60b detects a fault by monitoring the current detected by the current transformer 32c connected in series with the secondary winding 72c of the series transformer 49c.

When the system fault is detected, the control unit 60b immediately outputs a gate signal to the low-voltage bypass semiconductor circuit breaker 20c connected in parallel with the secondary winding 72c of the series transformer 49c, to set the low-voltage bypass semiconductor circuit breaker 20c to ON and then the low-voltage bypass mechanical circuit breaker 21c to ON but with a delay time that is inherently unavoidable in its operation.

The reason both the low-voltage bypass semiconductor circuit breaker 20c and the low-voltage bypass mechanical circuit breaker 21c are used together is as follows. The low-voltage bypass semiconductor circuit breaker 20c is a fast-switching device that can be quickly set to ON and if the duration of current conduction for a fault current is short, the rating of the apparatus is lowered. If the fault current is conducted for a relatively long period of time, semiconductor devices such as thyristors or GTOs that comprise the low-voltage bypass semiconductor circuit breaker 20c may be heated because of their own small resistance, possibly causing themselves to be damaged. Thermal considerations thus require heavy-duty semiconductor devices and cooling equipment. Such a problem will be solved if the low-voltage bypass mechanical circuit breaker 21c having a higher current and thermal capacity is used to bypass the fault current.

In this case, the series mechanical circuit breakers 11c, 12c connected in series with the primary winding 71c of the series transformer 49c at both its ends are left closed. Once they are opened, some time is subsequently required before the series mechanical circuit breakers 11c, 12c come back to their closed state, and thus an immediate interconnection of the series system interconnection assembly 46 back into the system is difficult at the moment the system has recovered from the system fault.

The series mechanical circuit breakers 11c and 12c are opened when the series system interconnection assembly 46 itself is suspended or fails. By activating the high-voltage bypass mechanical circuit breaker 10c, the series system interconnection assembly 46 is disconnected from the power system 48c.

After verifying that the power system 48c has recovered from the system fault, the control unit 60b opens the low-voltage bypass mechanical circuit breaker 21c to cause the voltage-type AC-DC converter 50a to operate normally. When the fault is removed prior to the activation of the low-voltage bypass semiconductor circuit breaker 20c, the control unit 60b, without activating the low-voltage bypass mechanical circuit breaker 21c, deactivates the low-voltage bypass semiconductor circuit breaker 20c for normal operating conditions (system restart), thereby restarting the operation of the series system interconnection assembly 46.

Since the low-voltage bypass semiconductor circuit breaker 20c handles a relatively higher current and a relatively lower voltage than the high-voltage bypass semiconductor circuit breaker 13c, a narrower insulating separation is permitted. A compact and low-cost apparatus thus results.

Embodiment 4

Figure 8:
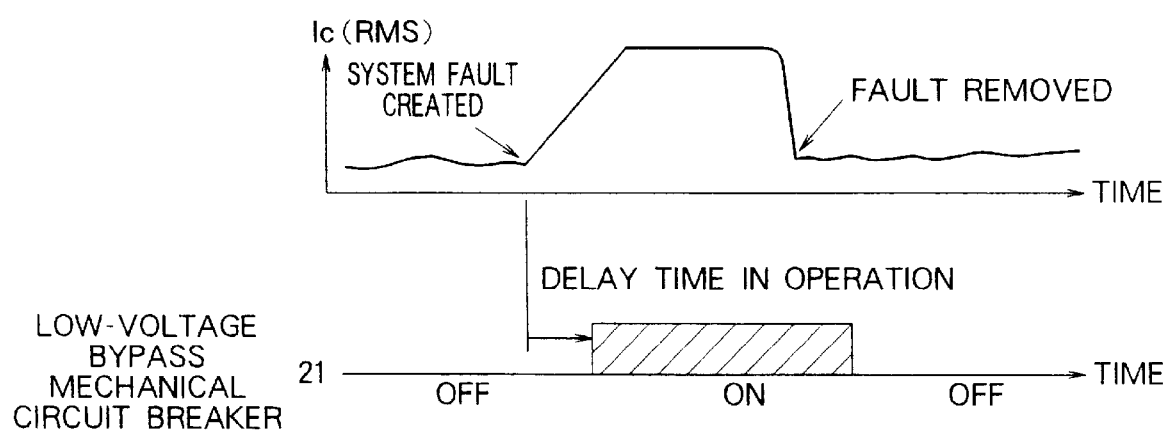
FIG. 8 is a timing diagram showing the operation of the fourth embodiment of the present invention.

In the third exemplary embodiment, the low-voltage bypass semiconductor circuit breaker 20c is first set to ON immediately after a system fault is detected. When the system inducatance XL 59c lying in the c phase of the power system 48c is high, or when the switching speed to ON in the low-voltage bypass mechanical circuit breaker 21c is set fast, however, the low-voltage bypass mechanical circuit breaker 21c is fast enough in shifting to the ON state to bypass the fault current without the need for using the low-voltage bypass semiconductor circuit breaker 20c, because the system current Ic at the system fault in the power system 48c rises at a relatively slow speed as shown in FIG. 8.

Figure 7:
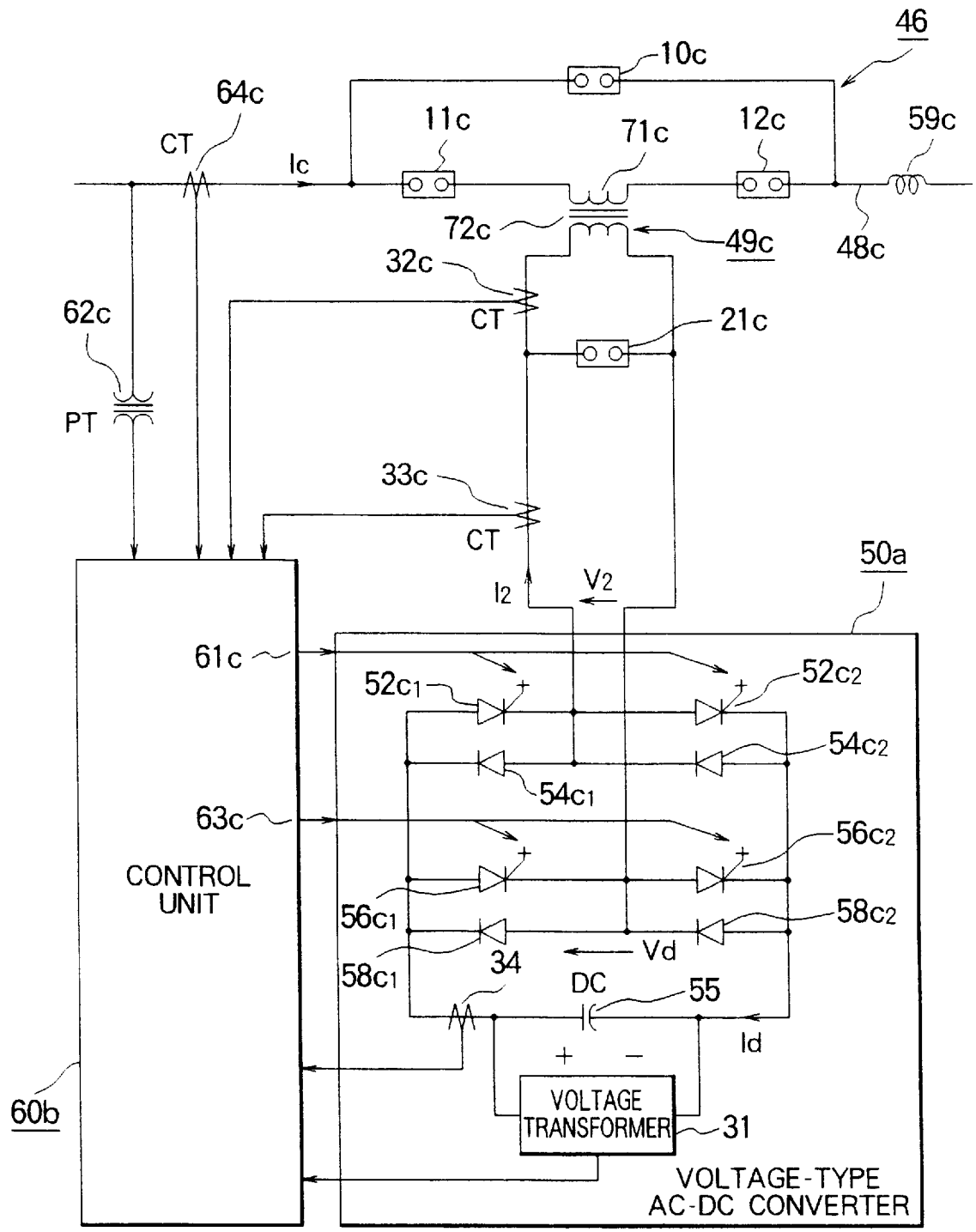
FIG. 7 is a schematic diagram of the power converter protective apparatus according to a fourth embodiment of the present invention.

FIG. 7 shows the schematic diagram of the power converter protective apparatus according to the fourth exemplary embodiment of the present invention. In FIG. 7, the components equivalent to those with reference to FIG. 5 are designated with the same reference numerals. The difference in circuit from the apparatus of the third exemplary embodiment is that the low-voltage bypass semiconductor circuit breaker 20c, connected in parallel with the low-voltage bypass mechanical circuit breaker 21c, is no longer needed.

Upon detecting a system fault, the control unit 60b immediately activates the low-voltage bypass mechanical circuit breaker 21c connected in parallel with the secondary winding 72c of the series transformer 49c to prevent an excess current due to the fault from flowing into the voltage-type AC-DC converter 50a. Since in this case, the rate of rising of the system current Ic at the fault in the power system 48c is relatively slow, the relatively slow response low-voltage bypass mechanical circuit breaker 21c is shifted sufficiently fast to the ON state to bypass the fault current.

Elimination of the low-voltage bypass semiconductor circuit breaker 20c reduces the cost and required installation space of the apparatus.

Embodiment 5

In the first exemplary embodiment, the high-voltage bypass mechanical circuit breaker 10c is connected in parallel with the series connection of the primary winding 71c and the series mechanical circuit breakers 11c, 12c, and furthermore the series connection of the high-voltage bypass semiconductor circuit breaker 13c and the mechanical disconnecting switch 15c is connected in parallel with the high-voltage bypass mechanical circuit breaker 10c. In this embodiment, however, the mechanical disconnecting switch 15c is eliminated and the high-voltage bypass semiconductor circuit breaker 13c is connected in parallel with the primary winding 71c as a high-voltage shorting semiconductor circuit breaker 14c.

Figure 9:
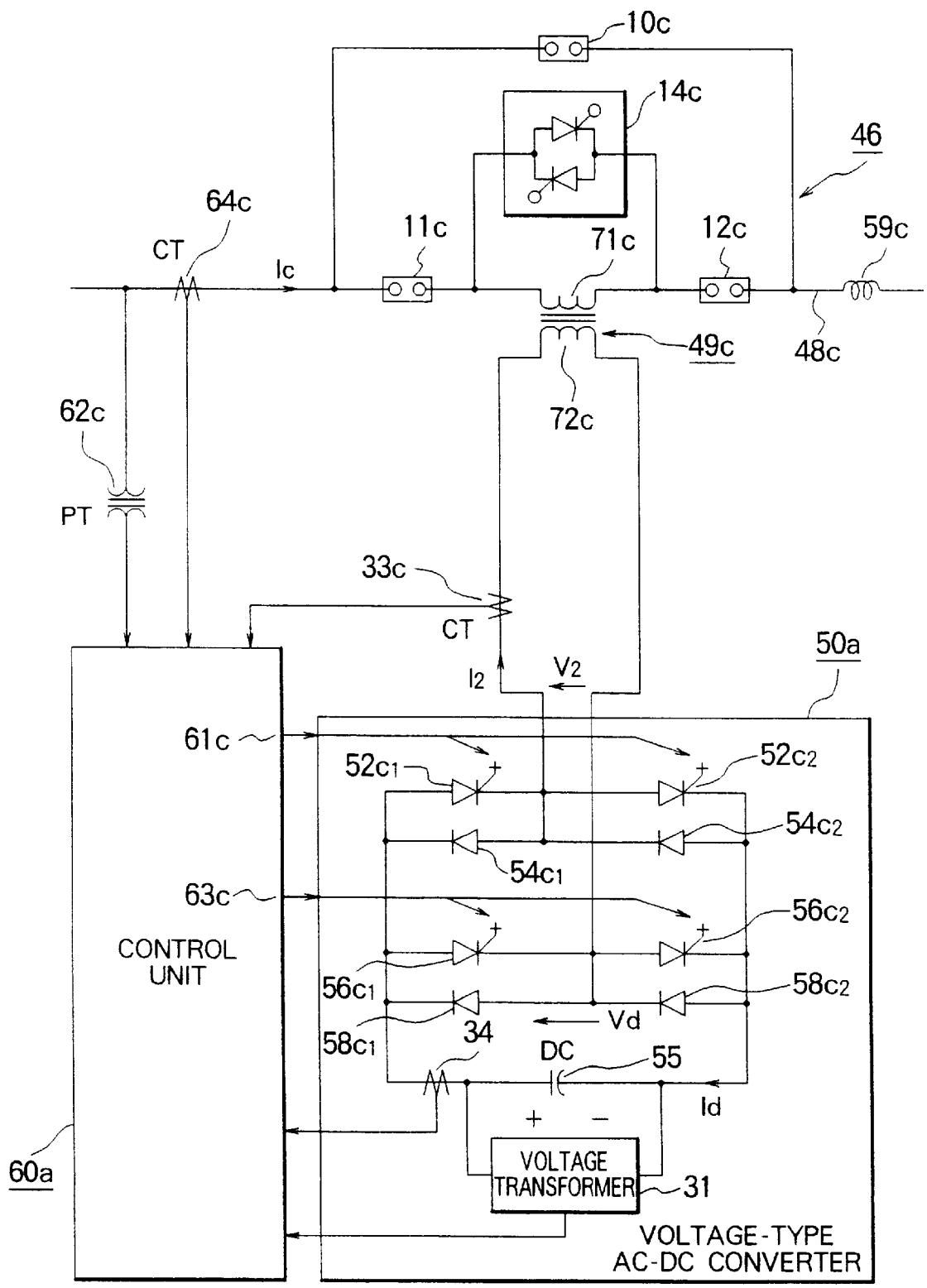
FIG. 9 is a schematic diagram of the power converter protective apparatus according to the fifth embodiment of the present invention.

Referring to drawings, the fifth exemplary embodiment is now discussed. FIG. 9 is the schematic diagram of the power converter protective apparatus according to the fifth exemplary embodiment of the present invention. In FIG. 9, the components equivalent to those with reference to FIG. 1 are designated with the same reference numerals. The high-voltage shorting semiconductor circuit breaker 14c comprising semiconductor devices such as thyristors or GTOs is connected in parallel with the primary winding 71c of the series transformer 49c.

Figure 10:
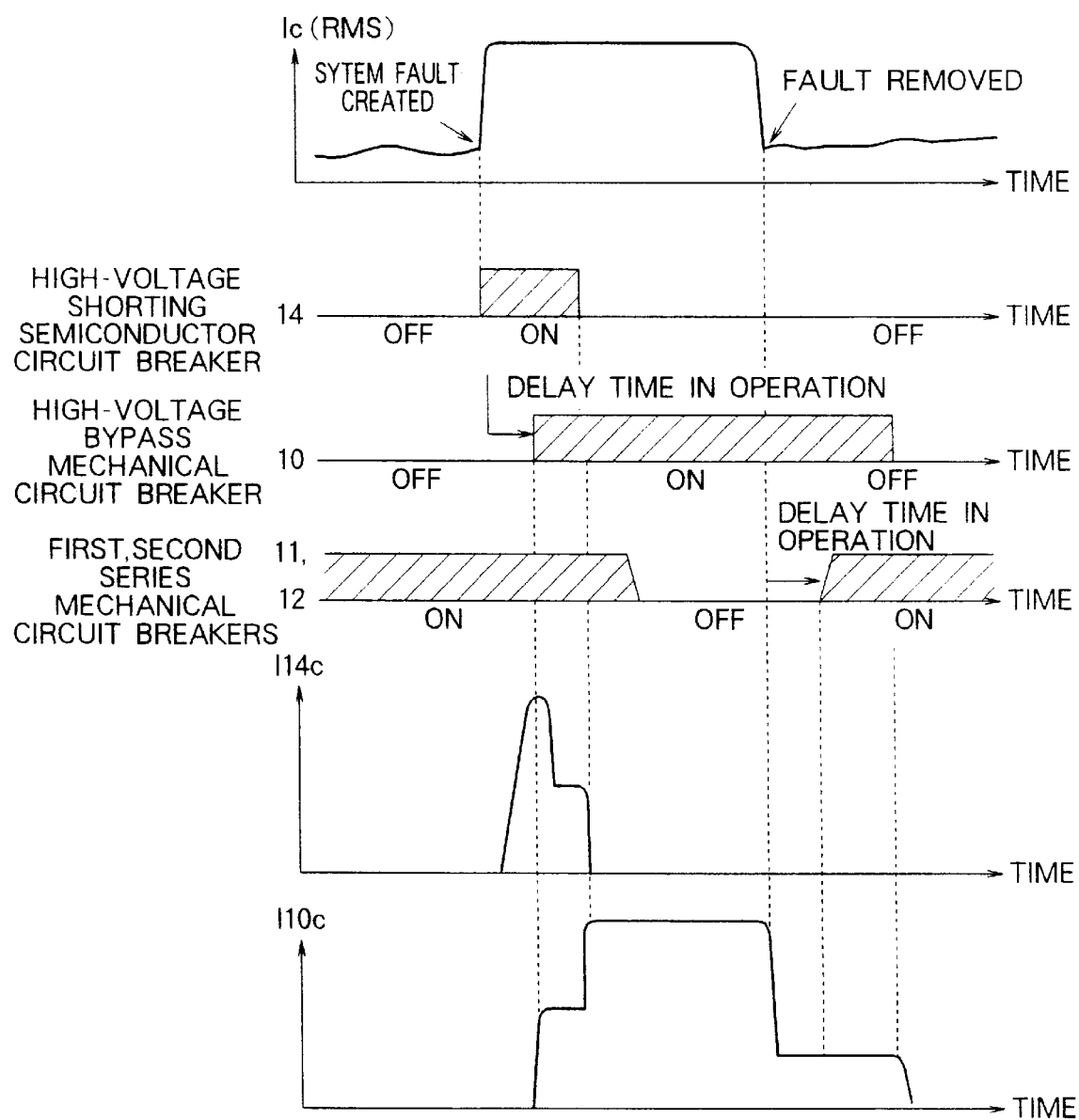
FIG. 10 is a timing diagram showing the operation of the fifth embodiment of the present invention.

Referring to the timing diagram in FIG. 10, the operation of the fifth exemplary embodiment is discussed. Upon detecting a system fault, the control unit 60a sends a gate signal to the high-voltage shorting semiconductor circuit breaker 14c to set it to ON, and then sends an ON signal to the high-voltage bypass mechanical circuit breaker 10c to set it to ON but with a delay time that is inherently unavoidable in its operation.

By allowing the fault current to flow through the high-voltage bypass mechanical circuit breaker 10c, the series system interconnection assembly 46 including the primary winding 71 of the series transformer 49c is protected against the system fault.

In this embodiment, the operation of the high-voltage shorting semiconductor circuit breaker 14c is substantially identical to that of the high-voltage bypass semiconductor circuit breaker 13c described with reference to the first exemplary embodiment.

By opening the series mechanical circuit breakers 11c, 12c, the high-voltage shorting semiconductor circuit breaker 14c is disconnected from the power system 48c. The high-voltage shorting semiconductor circuit breaker 14c can thus undergo maintenance service without interrupting power transmission if the high-voltage bypass mechanical circuit breaker 10c is let ON.

Embodiment 6

In the first exemplary embodiment, the high-voltage bypass mechanical circuit breaker 10c is connected in parallel with the series connection of the primary winding 71c and the series mechanical circuit breakers 11c, 12c, and furthermore the series connection of the high-voltage bypass semiconductor circuit breaker 13c and the mechanical circuit breaker 15c is connected in parallel with the high-voltage bypass mechanical circuit breaker 10c. In this embodiment, only the series connection of the mechanical circuit breaker 15c and the high-voltage bypass semiconductor circuit breaker 13c is connected in parallel with the primary winding 71c.

Figure 11:
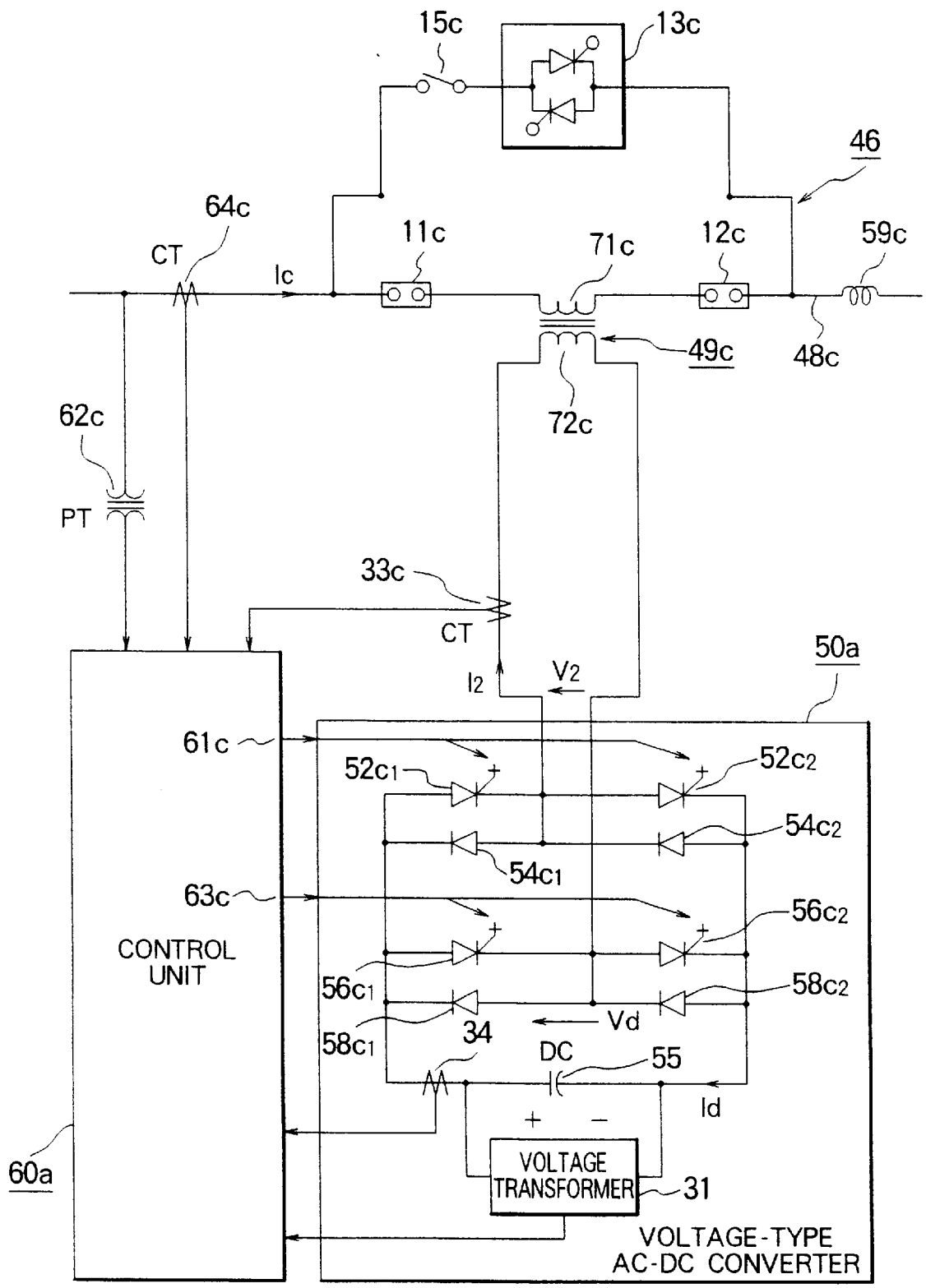
FIG. 11 is a schematic diagram of the power converter protective apparatus according to sixth embodiment of the present invention.

Referring to drawings, the sixth exemplary embodiment is now discussed. FIG. 11 is the schematic diagram of the power converter protective apparatus according to the sixth exemplary embodiment of the present invention. In FIG. 11, the components equivalent to those with reference to FIG. 1 are designated with the same reference numerals. The sixth exemplary embodiment differs from the first exemplary embodiment in that the high-voltage bypass mechanical circuit breaker 10c is dispensed with, and the rest of the construction is identical to that of the first exemplary embodiment.

Figure 12:
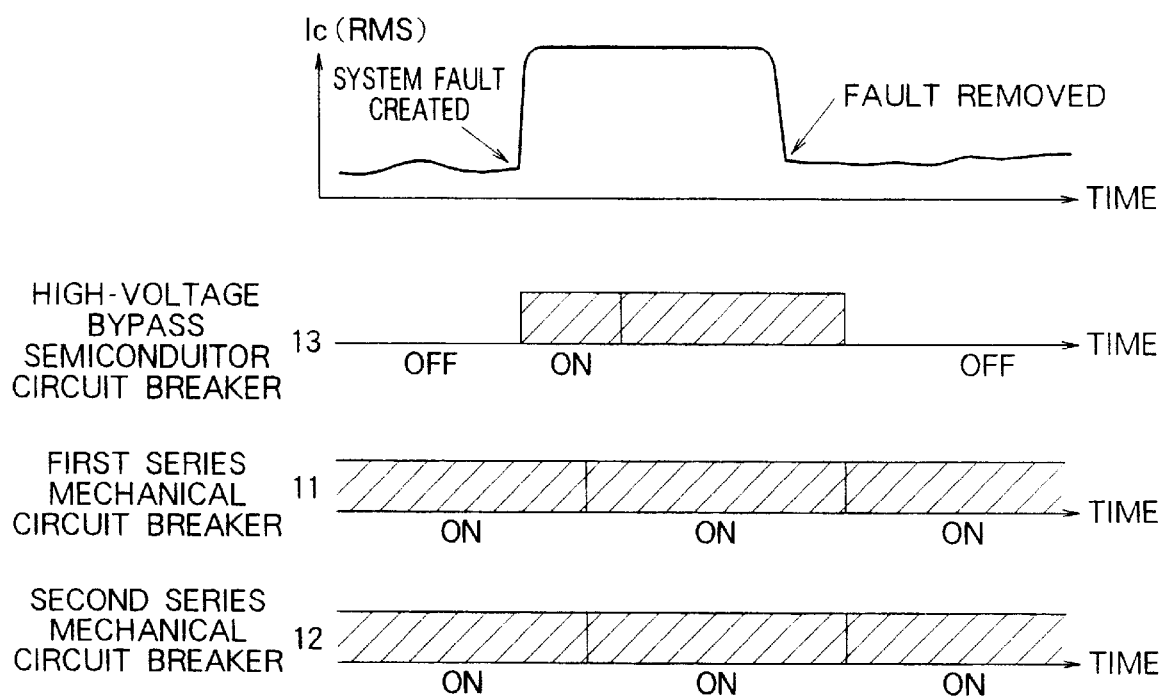
FIG. 12 is a timing diagram showing the operation of the sixth embodiment of the present invention.

The operation of the sixth exemplary embodiment is discussed referring to the timing diagram in FIG. 12. The sixth exemplary embodiment is identical to the first exemplary embodiment in operation in that upon detecting a system fault, the control unit 60a immediately activates the high-voltage bypass semiconductor circuit breaker 13c, but is different in that the system current Ic is prevented from flowing into the series system interconnection assembly 46 by keeping the high-voltage bypass semiconductor circuit breaker 13c activated until the system is recovered from its fault.

In the high-voltage bypass semiconductor circuit breaker 13c, semiconductor switching devices should be rated so that they allow fault currents to be continuously conducted therethrough during the system fault or maintenance time of the series system interconnection assembly 46. However, since the high-voltage bypass mechanical circuit breaker 10c is dispensed with, a compact and low-cost apparatus results with less of an installation space requirement.

Embodiment 7

In the third exemplary embodiment, both the low-voltage bypass mechanical circuit breaker 21c and the low-voltage bypass semiconductor circuit breaker 20c are connected in parallel with the secondary winding 72c. In this embodiment, the low-voltage bypass mechanical circuit breaker 21c only is connected in parallel with the secondary winding 72c.

Figure 13:
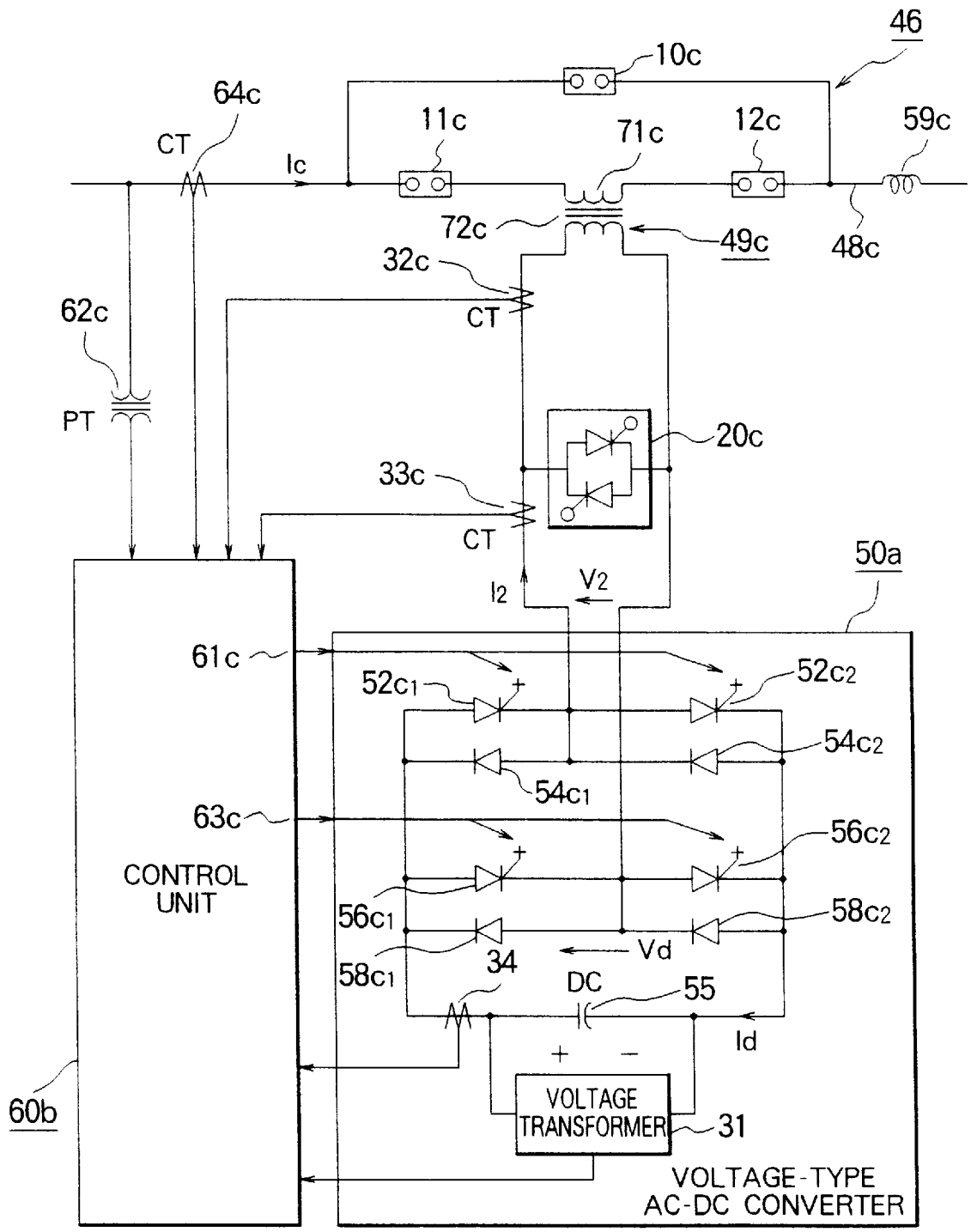
FIG. 13 is a schematic diagram of the power converter protective apparatus according to seventh embodiment of the present invention.

Referring to drawings, the seventh exemplary embodiment is discussed. FIG. 13 is the schematic diagram of the power converter protective apparatus according to the seventh exemplary embodiment of the present invention. In FIG. 13, the components equivalent to those with reference to FIG. 5 are designated with the same reference numerals. The seventh exemplary embodiment differs from the third exemplary embodiment in that the low-voltage bypass mechanical circuit breaker 21c is dispensed with, and the rest of the construction is identical to that of the third exemplary embodiment.

Figure 14:
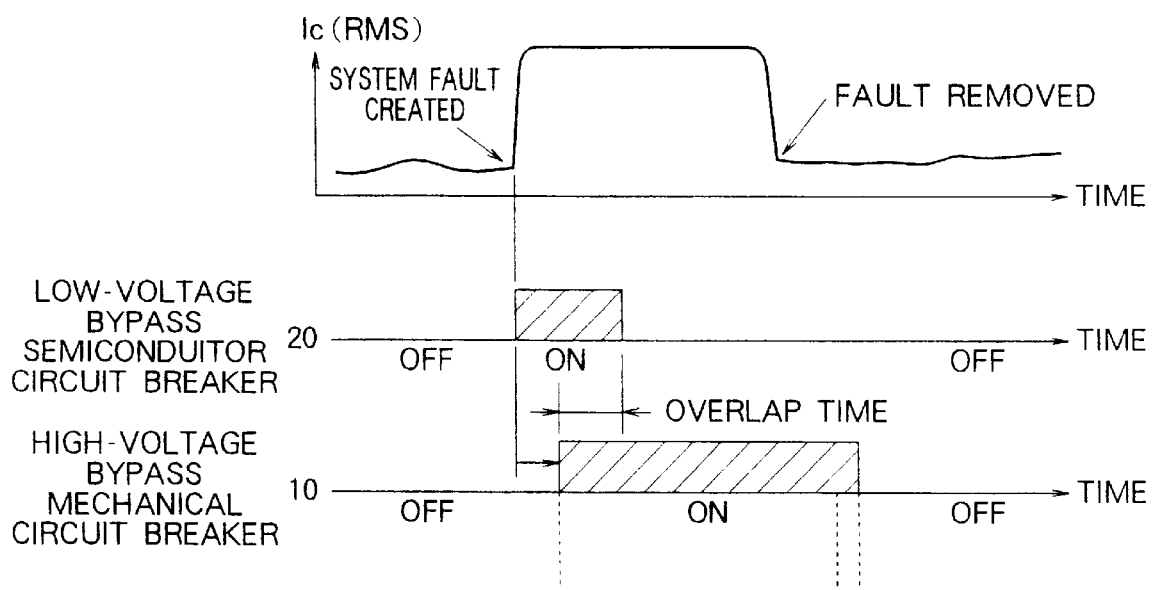
FIG. 14 is a timing diagram showing the operation of the seventh embodiment of the present invention.

The operation of the seventh exemplary embodiment is discussed referring to the timing diagram in FIG. 14. The seventh exemplary embodiment is identical to the third exemplary embodiment in operation in that upon detecting a system fault, the control unit 60b immediately activates the low-voltage bypass semiconductor circuit breaker 20c, but is different in that, to prevent a fault current from flowing into the voltage-type AC-DC converter 50a upon the detection of the system fault, the low-voltage bypass semiconductor circuit breaker 20c is immediately set to ON, and then the low-voltage bypass semiconductor circuit breaker 20c is activated with a delay time that is inherently unavoidable in its operation.

The third exemplary embodiment uses both the high-voltage bypass mechanical circuit breaker 10c and the low-voltage bypass semiconductor circuit breaker 20c, while the seventh exemplary embodiment dispenses with the low-voltage bypass semiconductor circuit breaker 20c. Therefore, a compact and low-cost apparatus results.

What is claimed is:

1. A power converter protective apparatus comprising:

a transformer having a primary winding connected in series with a power system and a secondary winding connected to a power converter;

fault detector means for detecting a fault in the power system and generating a fault signal upon detecting a fault in the power system;

control means for outputting a bypass control signal when the fault detector means generates a fault signal; and normally open current bypass means connected in parallel with the primary winding and responsive to the bypass control signal so that a fault current flowing through the primary winding is bypassed by the current bypass means in response to detection of a fault in the power system, the current bypass means comprising a parallel connection of a high-voltage bypass semiconductor circuit breaker and a high-voltage bypass mechanical circuit breaker, the high-voltage bypass semiconductor circuit breaker being closed for a fixed time upon detection of a fault and thereafter opening, the high-voltage bypass mechanical circuit breaker being closed upon detection of a fault and remaining closed until the fault is removed.

2. The power converter protective apparatus according to claim 1, wherein the fault detector means includes means for detecting a fault in the power system through the secondary winding of the transformer.

3. A power converter protective apparatus comprising:

a transformer having a primary winding connected in series with a power system and a secondary winding connected to a power converter;

fault detector means for detecting a fault in the power system and generating a fault signal upon detecting a fault in the power system;

control means for outputting a bypass control signal when the fault detector means generates a fault signal; and normally open current bypass means connected in parallel with the secondary winding and responsive to the bypass control signal so that a fault current flowing through the secondary winding is bypassed by the current bypass means in response to detection of a fault in the power system, the current bypass means comprising a parallel connection of a low-voltage bypass semiconductor circuit breaker and a low-voltage bypass mechanical circuit breaker, the low-voltage bypass semiconductor circuit breaker being closed for a fixed time upon detection of a fault and thereafter opening, the low-voltage bypass mechanical circuit breaker being closed upon detection of a fault and remaining closed until the fault is removed.

4. The power converter protective apparatus according to claim 3, wherein the fault detector means includes means for detecting a fault in the power system through the secondary winding of the transformer.

5. A power converter protective apparatus comprising:
   a transformer having a primary winding connected in series with a power system and a secondary winding connected to a power converter;
   two mechanical circuit breakers connected in series with the primary winding and the power system, with the primary winding connected between the two mechanical circuit breakers;
   a high-voltage bypass mechanical circuit breaker connected in parallel with the serial connection of the two mechanical circuit breakers and the primary winding;
   a high-voltage bypass semiconductor circuit breaker connected in parallel with the primary winding;
   fault detector means for detecting a fault in the power system and generating a fault signal upon detecting a fault in the power system; and
   control means closing the high-voltage bypass semiconductor circuit breaker for a fixed time upon generation of the fault signal and closing the high-voltage bypass mechanical circuit breaker upon generation of the fault signal and keeping the high-voltage bypass mechanical circuit breaker closed until the fault is removed so that a fault current flowing through the primary winding is bypassed.

6. The power converter protective apparatus according to claim 5, wherein the fault detector means includes means for detecting a fault in the power system through the secondary winding of the transformer.

* * * * *

UNITED STATES PATENT AND TRADEMARK OFFICE
CERTIFICATE OF CORRECTION

PATENT NO. : 5,815,387
DATED : September 29, 1998
INVENTOR(S) : Tomohiko Aritsuka It is certified that error appears in the above-identified patent and that said Letters Patent is hereby corrected as shown below:

Column 14, Line 17, change "flowing through"

to --bypasses--;

Line 17, delete "is";

Line 18, delete "bypassed".

Signed and Sealed this

Nineteenth Day of January, 1999

Attest:

Attesting Officer

*Acting Commissioner of Patents and Trademarks*